Sept. 26, 1967

L. P. POLRIES 3,344,332

DIRECT CURRENT RUNNING SPEED CONTROL IN WHICH A SPACE
DISCHARGE DEVICE IS INCLUDED
IN THE ARMATURE CIRCUIT

Filed Jan. 14, 1965

INVENTOR.
LOUIS P. POLRIES
BY
*Caswell Lagaard & Wicks*
ATTORNEYS 3,344,332
DIRECT CURRENT RUNNING SPEED CONTROL IN WHICH A SPACE DISCHARGE DEVICE IS INCLUDED IN THE ARMATURE CIRCUIT
Louis P. Polries, Minneapolis, Minn., assignor to Seco Electronics Corporation, Hopkins, Minn., a corporation of Minnesota
Filed Jan. 14, 1965, Ser. No. 425,479
6 Claims. (Cl. 318—332)

ABSTRACT OF THE DISCLOSURE

A speed control for controlling the speed of a direct current motor which control includes an armature circuit energized by a source of alternating current having a silicon controlled rectifier therein adapted to be fired at various phase angles during each active pulse of said alternating current and further including a balanced armature feedback circuit producing a voltage derived from the difference between a voltage resulting from the current flowing in the armature circuit and a direct current reference voltage. A phase shifting circuit energized by the armature feed back circuit actuates the control circuit to vary the phase angle at which the silicon controlled rectifier fires and thereby varying the current in the armature circuit in accordance with the speed requirements of the motor.

Field of the invention

Direct current running speed control in which a space discharge device is included in the armature circuit.

Prior art

In prior art controls, complex circuits have been employed using expensive saturable core type reactors.

Summary

The invention resides in employing in the control circuit an ordinary laminated core transformer with a split secondary, one section of which feeds the control circuit and the other of which feeds the phase shifting circuit.

Description

Figure 1:
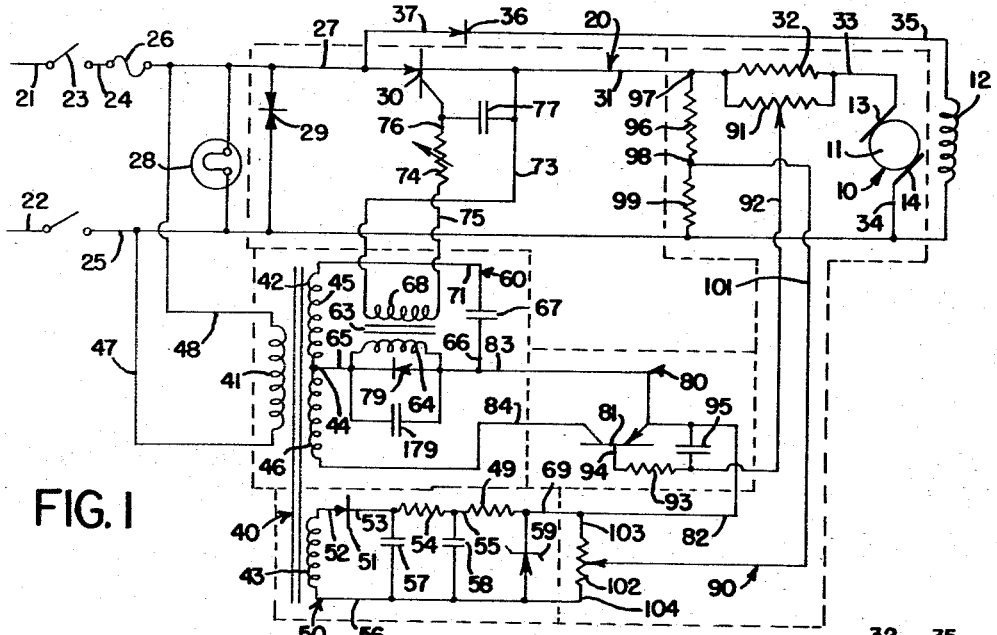
Figure 2:
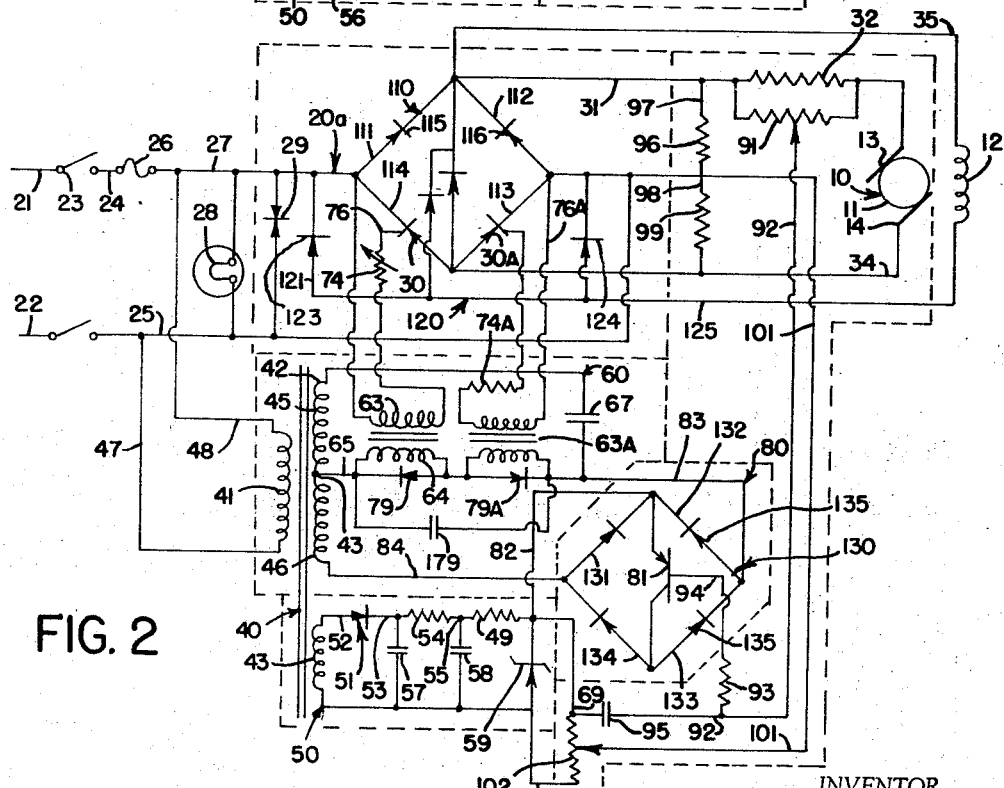

In the drawings:
FIG. 1 is a wiring diagram of a motor speed control using half wave rectification and illustrating an embodiment of the invention.
FIG. 2 is a wiring diagram of a motor speed control similar to that shown in FIG. 1 and using full wave rectification.

The form of the invention shown in FIG. 1 is the simplest and will be first explained. The motor whose speed is to be regulated is indicated by the reference numeral 10 and has an armature 11 fed by brushes 13 and 14 and a field winding 12 which are connected in the various circuits of the control as will be subsequently described.

For furnishing current for the armature 11 of motor 10 an armature circuit 20 is utilized which is energized by a source of alternating current having two conductors 21 and 22 connected to a line switch 23. The switch 23 is connected to two conductors 24 and 25 of which the conductor 24 is connected to a fuse 26 which in turn is connected to another conductor 27. Conductors 25 and 27 form the power line for energizing the motor 10 and the speed control therefor. A pilot light 28 and a thyrector 29 are connected across the connectors 25 and 27. The conductor 27 is connected to the anode of a silicon controlled rectifier 30. The cathode of this rectifier is connected to another conductor 31. This latter conductor is connected to a resistor 32 and which is connected by means of a conductor 33 to one brush 13 of the armature 11. The other brush 14 of this armature is connected by a conductor 34 to the conductor 25.

The field 12 of motor 10 is connected at one end by means of a conductor 35 to a rectifier 36 which is connected in turn to the conductor 27 by means of a conductor 37. The other end of said field 12 is directly connected to conductor 25.

For supplying electrical energy for the control a laminated transformer 40 is employed which comprises a primary 41 and two secondaries 42 and 43. The secondary 42 is provided with a tap 44 dividing the same into two sections 45 and 46. The two secondaries are insulated from one another. The primary 41 is connected by conductors 47 and 48 to the conductors 25 and 27.

The secondary 43 of transformer 40 supplies electrical energy to a power supply 50 which includes a rectifier 51 which is connected to one end of the secondary 43 by means of a conductor 52. The other side of this rectifier is connected by means of a conductor 53 to a resistor 54. This resistor is connected to a conductor 55 which in turn is connected to another resistor 49. A conductor 69 is connected to the other end of resistor 49. The other end of secondary 43 is connected to a conductor 56. Extending across conductors 53 and 56 and 55 and 56 are capacitors 57 and 58. These capacitors and resistors 54 and 49 smooth out the ripples in the voltage resulting from secondary 43. A voltage regulator semi-conductor 59 connected across conductors 55 and 69 provides substantially constant voltage across said conductors.

The invention utilizes a control circuit 60 which is energized from section 45 of the secondary 42 of transformer 40. In this circuit is disposed the primary 64 of a laminated firing transformer 63 which is connected at one end to the tap 44 of the secondary 42 of transformer 40 by means of a conductor 65. The other end of said primary is connected by means of a conductor 66 to a capacitor 67 which in turn is connected by means of a conductor 71 to the end of section 45. The primary 64 is shunted by means of a diode 79 and a capacitor 179.

The secondary 68 of firing transformer 63 is connected at one end to conductor 31 by means of a conductors 73 and at its other end to a variable resistor 74 by means of a conductor 75. This resistor is in turn connected by a conductor 76 to the gate of silicon controlled rectifier 30. A capacitor 77 is connected across conductor 73 and conductor 76.

The phase shift circuit is indicated by reference numeral 80. This circuit utilizes a transistor 81. The emitter of this transistor is connected by means of a conductor 82 to conductor 69 of the power supply 50. It is also connected by means of a conductor 83 to conductor 66 of control circuit 60. The collector of this transistor is connected by means of a conductor 84 to the outer end of the section 46 of secondary 42 of transformer 40.

The balanced armature feedback circuit is indicated by the reference numeral 90. This circuit utilizes the resistor 32 together with a voltage divider 91 shunting the said resistor. The moving contact of this voltage divider is connected by means of a conductor 92 to another resistor 93 which in turn is connected by a conductor 94 to the base of transistor 81. A capacitor 95 is connected across the conductors 82 and 94. The said circuit further includes a resistor 96 which is connected by means of a conductor 97 to the conductor 31 and by means of a conductor 98 to a dropping resistor 99. Resistor 99 is connected at its other end to conductor 25. A conductor 101 is connected to the conductor 98 and also to the movable contact of a variable resistor 102. This resistor is connected by means of a conductor 103 to conductor 69 and by means of a conductor 104 to conductor 56.

The operation of the invention is as follows: Resistor 102 is used to set the speed required for the motor. Assume that the pulses utilized are positive pulses, the silicon controlled rectifier 30 is inoperative at the beginning of the pulse, having started from zero at which voltage the flow of current is shut off. The current in the armature balanced feedback circuit is the difference between the reference voltage and the armature voltage in circuit 90 and will produce a signal to the transistor 81 which will be applied to the phase shifter circuit 80 and position the beginning of the pulse at a location with respect to the positive pulse waves reaching silicon controlled rectifier 30 so that when the pulse reaches such voltage the rectifier will fire. This causes the rectifier to conduct current through the armature circuit 20 and energize the armature. It will readily become apparent that the amount of energy transmitted during a pulse will only be a part of the total energy capable of being transmitted and this energy will depend on the phase position of the pulse resulting from the phase shift circuit. The position will be changed in accordance with the amount of current fed to the phase shift circuit by the balanced armature feedback circuit.

In FIG. 2 of the drawing the invention has been shown utilizing circuits in which full wave rectification is employed both for the armature circuit and the other circuits. These circuits are quite similar to the circuits shown in FIG. 1 and the description of the similar parts will not be repeated and the same reference numerals used to designate said parts. The power supply circuit 50 in this case is the same as shown in FIG. 1.

The armature circuit 20A utilizes a bridge rectifier 110 having four sections 111, 112, 113 and 114. In the sections 111 and 112 are connected diodes 115 and 116. In the sections 113 and 114 are connected silicon controlled rectifiers 30 and 30A. Conductor 31 is connected to the juncture between sections 111 and 112. Likewise conductor 34 is connected to the juncture between sections 113 and 114. Also conductor 27 is connected to the juncture between sections 111 and 114 and conductor 25 is directly connected to the juncture between sections 112 and 113. It will be noted that current from both pulses are utilized but that the armature is energized only when the silicon controlled rectifiers fire.

In addition to the bridge rectifier 110, a second bridge rectifier 120 is employed which supplies rectified current to the field winding 12. This rectifier utilizes the two sections 111 and 112 of rectifier 110 and also two sections 121 and 122 and in which are inserted diodes 123 and 124. These sections are connected together and to a conductor 125 which in turn is connected to one end of the field winding 12. The other end of field winding 12 is connected by means of conductor 35 to the juncture between sections 111 and 112 of bridge rectifier 120.

In addition to the transformer 63 another transformer 63A is employed. The secondary of the transformer 63 is connected to the juncture between sections 111 and 114 of bridge 110 and the gate of silicon controlled rectifier 30 and the secondary of transformer 63A is connected to the juncture between sections 112 and 113 of bridge 110 and the gate of silicon controlled rectifier 30A. With this rectifier direct current is always furnished to the field winding 12.

The phase shift circuit 80 utilizes a bridge rectifier 130. This rectifier has four sections 131, 132, 133 and 134. In each of these sections is a diode 135. The juncture between sections 131 and 132 of rectifier 130 is connected to the conductor 82 which is connected to conductor 69 and also to the emitter of transistor 81. The juncture between sections 133 and 134 is connected to the collector of transistor 81. The juncture between sections 131 and 134 is connected to conductor 84 while the juncture between sections 132 and 133 is connected to conductor 83. The base of the transistor 81 is connected to conductor 94.

The principal advantage of the invention resides in the fact that common laminated transformers may be used in place of saturated core transformers now used in speed controls thus greatly reducing the manufacturing cost of the invention. Smaller parts may also be used reducing the size of the speed control. The construction can also be constructed at less cost.

Changes in the specific form of the invention, as herein describer, may be made within the scope of what is claimed without departing from the spirit of the invention.

Having described the invention, what is claimed as new and desired to be protected by Letters Patent is:

1. In a speed control for direct current motors having an armature circuit energized by a source of alternating current, a silicon controlled rectifier in said armature circuit adapted to be fired at various phase angles during each active pulse of said alternating current and a balanced armature feedback circuit producing a voltage derived from the difference between a voltage resulting from the current flowing in the armature circuit and a direct current reference voltage, the combination of:
    (a) a laminated firing transformer having a primary and a secondary,
    (b) said primary being connected in a control circuit energized from an alternating current source, said control circuit including,
    (c) a diode shunting said primary,
    (d) a capacitor shunting said diode and primary,
    (e) a capacitor in series with said primary, diode and first capacitor,
    (f) the secondary of said firing transformer being connected in the gate circuit of said silicon controlled rectifier and
    (g) a phase shift circuit actuated by said balanced armature feedback circuit and connected to said control circuit for varying the phase angle at which the silicon controlled rectifier fires to vary the current in the armature circuit in accordance with the speed requirements of the motor.

2. In a speed control for direct current motors having an armature circuit energized by a source of alternating current, a silicon controlled rectifier in said armature circuit adapted to be fired at various phase angles during each active pulse of said alternating curent and a balanced armature feedback circuit producing a voltage derived from the difference between a voltage resulting from the current flowing in the armature circuit and a direct current reference voltage, the combination of:
    (a) a laminated firing transformer having a primary and a secondary,
    (b) said primary being connected in a control circuit energized by one section of the tapped secondary of a laminated input transformer, said control circuit including,
    (c) a diode shunting said primary,
    (d) a capacitor shunting said diode and primary,
    (e) a capacitor in series with said primary, diode and first capacitor,
    (f) the secondary of said transformer being connected in the gate circuit of said silicon controlled rectifier,
    (g) a phase shift circuit actuated by said balanced armature feedback circuit and energized from another section of the tapped secondary of said input transformer,
    (h) said firing transformer primary, said diode and capacitor in parallel therewith being common to both said control circuit and said phase shift circuit,
    (i) a transistor having an emitter, a base and a collector,
    (j) said emitter and collector being disposed in said phase shift circuit and
    (k) said emitter and said base being disposed in said balanced armature feedback circuit.

3. In a speed control for direct current motors having an armature circuit energized by a source of alternating current, a silicon controlled rectifier in said armature circuit adapted to be fired at various phase angles during each active pulse of said alternating current and a balanced armature feedback circuit producing a voltage derived from the difference between a voltage resulting from the current flowing in the armature circuit and a direct current reference voltage, the combination of:
 (a) a laminated firing transformer having a primary and a secondary,
 (b) said primary being connected in a control circuit energized from an alternating current source, said control circuit including,
 (c) a diode shunting said primary,
 (d) a capacitor shunting said diode and primary,
 (e) a capacitor in series with said primary diode and first capacitor,
 (f) the secondary of said transformer being connected in the gate circuit of said silicon controlled rectifier and
 (g) a phase shift circuit actuated by said balanced armature feedback circuit and connected to said control circuit and producing a rectangular shaped wave pulse applied to the control circuit for varying the phase angle at which the silicon controlled rectifier fires to vary the current in the armature circuit in acordance with the speed requirements of the motor.

4. In a speed control for direct current motors having an armature circuit energized by a source of alternating current, a silicon controlled rectifier in said armature circuit adapted to be fired at various phase angles during each active pulse of said alternating current and a balanced armature feedback circuit producing a voltage derived from the difference between a voltage resulting from the current flowing in the armature circuit and a direct current reference voltage, the combination of:
 (a) a laminated firing transformer having a primary and a secondary,
 (b) a laminated input transformer having a primary energized from a source of alternating current and a secondary having a tap intermediate the ends thereof to divide said secondary into two sections, the tap being common to both sections.
 (c) a capacitor connected to the primary of said firing transformer section,
 (d) a control circuit connected to the tap and one end of the secondary of said input transformer, said control circuit including,
 (e) a diode and a capacitor both connected in parallel to the primary of said firing transformer and in series with the first capacitor,
 (f) the secondary of said firing transformer being connected in the gate circuit of said silicon controlled rectifier,
 (g) a phase shift circuit actuated by said balanced armature feedback circuit and having one conductor connected to the other end of the secondary of said input transformer and the other conductor thereof connected to the juncture between said capacitors for varying the phase angle at which the silicon controlled rectifier fires to vary the current in the armature circuit in accordance with the speed requirements of the motor.

5. In a speed control for direct current motors having an armature circuit energized by a source of alternating current, a silicon controlled rectifier in said armature circuit adapted to be fired at various phase angles during each active pulse of said alternating current and a balanced armature feedback circuit producing a voltage derived from the difference between a voltage resulting from the current flowing in the armature circuit and a direct current reference voltage, the combination of:
 (a) a laminated firing transformer having a primary and a secondary,
 (b) a laminated input transformer having a primary energizeed from a source of alternating current and a secondary having a tap intermediate the ends thereof to divide said secondary into two sections, the tap being common to both sections,
 (c) a capacitor connected to the primary of said first transformer section,
 (d) a control circuit connected to the tap and one end of the secondary of said input transformer, said control circuit including,
 (e) a diode and a capacitor both connected in parallel to the primary of said firing transformer and in series with the first capacitor,
 (f) the secondary of said firing transformer being connected in the gate circuit of said silicon controlled rectifier,
 (g) a phase shift circuit actuated by said balanced armature feedback circuit and having one conductor connected to the other end of the secondary of said input transformer and the other conductor thereof connected to the juncture between said capacitors for varying the phase angle at which the silicon controlled rectifier fires to vary the current in the armature circuit in accordance with the speed requirements of the motor,
 (h) a transistor having an emitter, a base and a collector,
 (i) said emitter and collector being disposed in said phase shift circuit and
 (j) said emitter and said base being disposed in said balanced armature feedback circuit.

6. In a speed control for direct current motors having an armature circuit energized by a source of alternating current, a silicon controlled rectifier in said armature circuit adapted to be fired at various phase angles during each active pulse of said alternating current and a balanced armature feedback circuit producing a voltage derived from the difference between a voltage resulting from the current flowing in the armature circuit and a direct current reference voltage, the combination of:
 (a) two laminated firing transformers each having a primary and a secondary,
 (b) said primaries being connected in series in a control circuit energized from an alternating current source, said control circuit including,
 (c) a capacitor connected in series with both of said primaries,
 (d) a diode connected in parallel with each of said primaries,
 (e) capacitative means shunting said diodes,
 (f) a rectifier bridge circuit connected at opposite junctures to said armature circuit,
 (g) said control circuit being connected to the other junctures of said bridge at the adjoining sections thereof, and
 (h) a phase shift circuit actuated by said balanced armature feedback circuit and connected to said control circuit for varying the phase angle at which the silicon controlled rectifier fires to very the current in the armature circuit in accordance with the speed requirements of the motor.

References Cited

UNITED STATES PATENTS 2,858,495 10/1958 Shrider _____ 318—308 X
3,286,151 11/1966 Dinger _____ 318—331 X BENJAMIN DOBECK, *Primary Examiner.*

ORIS L. RADER, *Examiner.*

J. J. BAKER, *Assistant Examiner.*